(12) United States Patent
Hu et al.

(10) Patent No.: US 8,559,557 B2
(45) Date of Patent: Oct. 15, 2013

(54) TELECOMMUNICATION METHOD AND APPARATUS

(75) Inventors: Yang Hu, Beijing (CN); David Astely, Bromma (SE); Jingyi Liao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 223 days.

(21) Appl. No.: 13/120,699

(22) PCT Filed: Sep. 24, 2008

(86) PCT No.: PCT/SE2008/051067
§ 371 (c)(1),
(2), (4) Date: Mar. 24, 2011

(87) PCT Pub. No.: WO2010/036156
PCT Pub. Date: Apr. 1, 2010

(65) Prior Publication Data
US 2011/0176637 A1 Jul. 21, 2011

(51) Int. Cl.
*H03K 9/00* (2006.01)
(52) U.S. Cl.
USPC ........... 375/316; 375/150; 370/337; 370/329; 370/312; 370/335
(58) Field of Classification Search
USPC ........... 375/316, 150; 370/337, 329, 335, 312
See application file for complete search history.

(56) References Cited

U.S. PATENT DOCUMENTS

| | | | |
|---|---|---|---|
| 6,545,994 B2 * | 4/2003 | Nelson et al. | 370/337 |
| 6,983,128 B2 * | 1/2006 | Wright | 455/73 |
| 7,693,103 B2 * | 4/2010 | Champion et al. | 370/329 |
| 2006/0227857 A1 * | 10/2006 | Gaal | 375/150 |
| 2009/0213813 A1 * | 8/2009 | Futagi et al. | 370/335 |
| 2011/0044223 A1 * | 2/2011 | Kim et al. | 370/312 |

FOREIGN PATENT DOCUMENTS

| WO | WO 2007/126013 A1 | 11/2007 |
|---|---|---|
| WO | WO 2008/014275 A2 | 1/2008 |

OTHER PUBLICATIONS

International Preliminary Report on Patentability and Written Opinion of the International Searching Authority corresponding to International Application No. PCT/SE2008/051067; Date of issuance of this report: Mar. 29, 2011; 6 pages.
International Search Report corresponding to PCT Application No. PCT/SE2008/051067, Date of Mailing: Jul. 21, 2009.

(Continued)

*Primary Examiner* — Eva Puente
(74) *Attorney, Agent, or Firm* — Myers Bigel Sibley & Sajovec, P.A.

(57) ABSTRACT

Methods of transmitting and receiving information in a telecommunications network are described. A method of transmitting, for example, includes identifying a message for transmission, the message selected from a plurality of predetermined messages, and selecting a code combination from a set of codes combinations, each code combination corresponding to a predetermined message. Data is encoded with the selected code combination, and the encoded data is transmitted. A method of receiving may include receiving the signal including data encoded for transmission with the selected code combination, and decoding the signal to retrieve unencoded data, the decoding including determining with which code combination selected from the set of code combinations the data is encoded. The data is decoded, and the message for transmission is selected from the plurality of predetermined messages, wherein the message is selected based on the code combination with which the data was encoded.

22 Claims, 5 Drawing Sheets

(56) References Cited

OTHER PUBLICATIONS

Ohuchi et al. "Analysis of the Bi-orthogonal Modulation System Using Two Different Inner Sequences" IEEE $6^{th}$ International Symposium on Spread Spectrum Techniques and Applications, pp. 743-746, Piscataway, New Jersey, Sep. 6-8, 2000.

IPWireless, NexWave Wireless "IDD PUCCH", $3^{rd}$ Generation Partnership Project, 3GPP TSG RAN WG1#50bis, Shanghai, P.R. China, 9 pages, Oct. 8-12, 2007.

Chinese Search Report Corresponding to Chinese Patent Application No. 200880131253.5; Dated: Feb. 25, 2013; 2 Pages.

* cited by examiner

TELECOMMUNICATION METHOD AND APPARATUS

CROSS REFERENCE TO RELATED APPLICATION

This application is a 35 U.S.C. §371 national stage application of PCT International Application No. PCT/SE2008/051067, filed on 24 Sep. 2008, the disclosure and content of which is incorporated by reference herein in its entirety. The above-referenced PCT International Application was published in the English language as International Publication No. WO 2010/036156 A1 on 1 Apr. 2010.

TECHNICAL FIELD

The present application relates to a telecommunication transmission method and apparatus, and is particularly applicable in a time division duplex telecommunication system in which more traffic is transmitted in one direction than in another, opposite, direction. The application relates particularly, but not exclusively, to transmission of feedback reports in a long term evolution (LTE) network.

BACKGROUND

A telecommunication network is shown schematically in FIG. 1. Mobile terminals 10 (also termed user equipment, or 'UE's) such as mobile phones, computers, PDAs, etc, are able to wirelessly transmit data to, and wirelessly receive data from, various base stations 20 (also termed 'BS's). Each base station may be in communication with a wired network 30, such as an optical network. The telecommunications network may be controlled by a network controller 40. The present invention relates primarily to the radio access portion of the network (i.e. to the wireless communications between the mobile terminals and the base stations), and so the remainder of the network will not be discussed in further detail.

Transmissions from a base station to a mobile terminal are generally termed 'downlink' transmissions, whilst transmissions from a mobile terminal to a base station are generally termed 'uplink' transmissions. Such transmissions may be either Frequency Division Duplex (FDD) or Time Division Duplex (TDD). In FDD, downlink and uplink transmissions are made in separate frequency bands, such that packets can be transmitted in the downlink and uplink directions at the same time. In TDD, on the other hand, downlink and uplink transmissions are made on the same frequency band and are transmitted in different predetermined time slots.

TDD is flexible in that the duration of downlink and uplink transmissions can be configured depending on the traffic intensity in the downlink and uplink directions, thus allowing for connections with asymmetric transmission schemes. For example, the time allocated to downlink traffic might be greater than the time allocated to uplink traffic for downlink intensive systems, and vice versa for uplink intensive systems. The present invention was conceived with LTE TDD in mind, which is generally downlink intensive.

In LTE, data is multiplexed in the downlink using orthogonal frequency division multiplexing (OFDM), whilst in the uplink single carrier frequency division multiple access (SC-FDMA, also known as discrete Fourier transform OFDM, or DFT-OFDM) is used.

Data is scheduled in radio frames with a periodicity of 5 ms or 10 ms. An example of a radio frame with 5 ms periodicity is shown in FIG. 2. Each frame 3 is 10 ms in duration, and comprises two sub-frames 5 of duration 5 ms. Each frame is split into transmission time intervals (TTIs). Some TTIs (those marked ↓) are scheduled for downlink transmissions, whilst others are scheduled for uplink transmissions (those marked ↑). It can be seen that there are more downlink TTIs than there are uplink TTIs (in this case the ratio of downlink time to uplink time is 3:1).

LTE requires a terminal that is receiving a transmission to transmit a feedback report to the sender of the transmission to confirm whether or not a scheduled transmission was received, and/or whether it was received correctly (various prior art methods exist for determining whether data is received correctly, and so that is not discussed herein). If the terminal receives the transmission correctly, then it is required to transmit an acknowledgement (ACK) to the sender. If it does not receive the transmission correctly (perhaps because it determines that errors have been introduced into the data, e.g. by interference during the transmission) then the terminal is required to transmit a negative acknowledgement (NACK) back to the sender, and the sender is required to retransmit the data. Such feedback communications take place on one or more channels dedicated for that purpose, which are often shared between multiple mobile terminals. The base station is able to determine which ACK/NACKs originate from which terminal, because each terminal is assigned a unique code with which it encodes its data before transmitting that data. As in code division multiplexing (CDM) the base station is able to distinguish between transmissions from various mobile terminals because the codes assigned to those various terminals are orthogonal (in the case of synchronous CDM) or pseudorandom (in the case of asynchronous CDM). A suitable type of code is the constant amplitude zero autocorrelation (CAZAC) code.

It can be seen that where the ratio of downlink:uplink is not 1:1 the requirement for feedback reports becomes problematic. Because more data is being sent in one direction than in another it is not simple to schedule one feedback report for each data packet that is transmitted.

Prior art methods have addressed this problem by bundling ACK/NACK data together. For example, FIG. 3 shows a situation where there are four downlink data streams for every one uplink. Three of the data streams (those marked ACK) are received successfully, whilst one is not (marked NACK). Because it is not possible to transmit four feedback (without increasing the payload of the upload signal, thus reducing the overall uplink performance), those feedback reports are combined using an 'AND' operation, where NACK takes precedence over ACK. The result is that a NACK feedback report is transmitted to the sender, meaning that all the data, including that which was received successfully, must be retransmitted.

Thus it can be seen that ACK/NACK bundling, whilst it can improve the performance of the uplink control channel (in LTE: the physical uplink control channel, or PUCCH), it can increase the burden on the downlink transmission (in LTE: the physical downlink shared channel, or PDSCH). That is, ACK/NACK bundling may lead to needless downlink re-transmission, which is inefficient as it reduces the downlink transmission throughput.

It is an object of the invention to alleviate some of the problems discussed above, by proposing a more efficient ACK/NACK bundling scheme. As will be discussed, however, the proposed solution has a wider application, and does not solely relate to an ACK/NACK bundling scheme.

SUMMARY

According to a first aspect of the invention there is provided a method of receiving a telecommunication signal, the method comprising: receiving a signal comprising data encoded for transmission with a code combination; decoding the signal to retrieve unencoded data, the decoding comprising determining with which code combination selected from a set of code combinations the data is encoded, and decoding the data; and selecting a meaning for the signal from a plurality of predetermined meanings, wherein the meaning is selected based on the code combination with which the data was encoded.

Using the above method an entity receiving a transmission is able to determine information about the meaning of the transmission from the code combination with which the transmission is encoded, as well as (or even instead of) from the data content of the transmission itself. That is, the selected code combination conveys information, as well as simply encoding the data for transmission. However, that additional information conveyed by the choice of code combination does not require any more bandwidth/bits to transmit in addition to the bandwidth/bits that are required to transmit the data.

The term 'code combination' is used to mean one or more codes, or combinations of codes, selected from a set of codes. For example, where the set of codes comprises {CAZAC1, CAZAC2} possible code combinations that might be selected from that set include {CAZAC1}, {CAZAC2}, {CAZAC1, CAZAC2}, {CAZAC2, CAZAC1}, etc. Such a set of codes is preferably uniquely assigned to a particular terminal in a transmission system.

Selecting the meaning may comprise comparing the identified code combination with stored data comprising possible code combinations that can be determined from the set of codes, and selecting the meaning that corresponds to the identified code combination from the stored data. For example, a look up table might be provided in an internal memory of the receiver, which it can use to determine the meaning of the signal.

The meaning of the signal is preferably selected based on at least some of the data which is transmitted in the signal, as well as the code combination with which the signal is encoded. For example, the table stored in memory may comprise a relation ship between each predetermined meaning, and a data value and code combination used to transmit that data value.

The set of codes may comprise two codes. Alternatively, the set of codes may comprise three codes, or four codes, or a plurality of codes.

In some embodiments, the signal may comprise two or more fields (i.e. two or more portions of the signal which can be distinguished from each other by the receiver, perhaps by their location within the signal, or by some other means). The meaning of the signal may be selected based on which of the two codes is used when transmitting each of the respective fields. The fields may comprise distinct portions of the signal, for example, a chronologically first half (or 'hop') of the signal and a second half (or 'hop'). The fields may comprise a first signal portion comprising feedback data and a second signal portion containing a reference signal.

As discussed above, the meaning that is selected may comprise feedback data.

The method may be implemented in a time division duplex telecommunication system.

According to a complementary aspect of the invention there is provided a method of transmitting a telecommunication signal, the method comprising: identifying a message for transmission, the message being selected from a plurality of predetermined messages; selecting a code combination from a set of codes combinations, each code combination corresponding to a predetermined message; encoding data with the selected code combination, and transmitting the encoded data, wherein at least one code combination of the set of code combinations imparts a meaning to the signal that is different from an unencoded meaning of the data, and wherein the code combination with which the signal is transmitted is selected based on the which of the predetermined messages has been identified for transmission.

The signal may comprise two or more distinct fields, and a code from the combination may be selected to transmit each of the respective fields. That is, the same code may be used to transmit all of the fields, or a different code may be used to transmit at least one of the fields, or each of the fields.

The data for transmission may be selected from a set of predetermined data values, each data value corresponding to a code combination and a predetermined message.

As discussed above, a transmitting terminal may comprise a memory comprising stored data which relates each predetermined message to at least a code combination, and possibly a data value and/or field relation.

The method may comprise generating feedback reports in respect of received data. Selecting the message for transmission may comprise bundling a plurality said feedback reports.

The method may be implemented in a time division duplex system in which the ratio of information received from a first transmission direction to information transmitted in a second, opposite, transmission direction is X:1 (where X≠1). In that case, identifying the message may comprise bundling information (such as feedback reports) as if the ratio were X/Y:1, wherein Y≤X, and Y≠0. That is, where the ratio of downlink to uplink transmissions is not 1:1, but is X:1, a terminal sending a feedback report will assume that the ratio is really lower than in reality. For example, if two codes are assigned to that terminal, it may assume that the ratio is (X/2):1.

Any of the above methods may be implemented in a code division multiplex system, by assigning at least one terminal in the system with more than one unique code. Preferably, where more data is transmitted in one direction than in another, all terminals required to transmit in the direction that is allocated less transmission time should be allocated more than one unique code.

According to another aspect of the invention, there is provided a method of conveying information in a telecommunications system, the method comprising:
  identifying a message for transmission, the message being selected from a plurality of predetermined messages;
  selecting a code combination from a set of codes combinations, each code combination corresponding to a predetermined message;
  encoding data with the selected code combination, and transmitting the encoded data;
  receiving the signal comprising data encoded for transmission with the selected code combination;
  decoding the signal to retrieve unencoded data, the decoding comprising determining with which code combination selected from the set of code combinations the data is encoded, and decoding the data; and
  selecting the message for transmission from the plurality of predetermined messages, wherein the message is selected based on the code combination with which the data was encoded.

According to a further aspect of the invention there is provided a telecommunications system comprising a plurality of transmitters and at least one receiver, each transmitter arranged to encode its transmissions with a unique code, and the receiver operable to identify which of the transmitters is an origin of a transmission by identifying with which of the respective unique codes that transmission is encoded, wherein at least one transmitter in the system is allocated more than one unique code.

In such a system more information can be transmitted in the same bandwidth, by using the selection of the code or code combination for a transmission to convey predetermined information about the transmission.

According to another aspect of the invention there is discussed terminal for a telecommunications system which is arranged to carry out one or more of the methods set out above. Such a terminal may be a mobile terminal, such as a mobile phone or a laptop computer, or may be a fixed terminal, such as a base station.

According to a final aspect of the invention there is provided a computer program encoded in a computer readable form, which is operable in use to cause a terminal in a telecommunications system to carry out the method of any one of the methods set out above. Such a computer program may be encoded on a mobile phone SIM (subscriber identity module) card, for instance.

DETAILED DESCRIPTION

As mentioned above, in LTE each mobile terminal is assigned a unique code, e.g. a CAZAC (constant amplitude zero auto-correlation) sequence in the frequency domain, with which it encodes its ACK/NACK transmissions, so that the receiving base station can distinguish between simultaneous feedback transmissions from the different mobile terminals using code division multiplexing (CDM). At its most basic, the present invention assigns at least one mobile terminal, and preferably each mobile terminal more than one unique code, rather than one, as in the prior art. A receiving base station is able to determine extra information, in addition to the ACK or NACK data that is transmitted, by looking at which code the mobile terminal has chosen to use to encode its transmission. In particular which the receiving terminal selects meaning for the transmission from a set of possible predetermined meanings based on its determination of which code combination is used for the transmission. The codes are thus used to provide the base station with extra information, without actually transmitting any extra data, meaning that the actual number of bits used for the transmission is the same as in the prior art.

Figure 4:
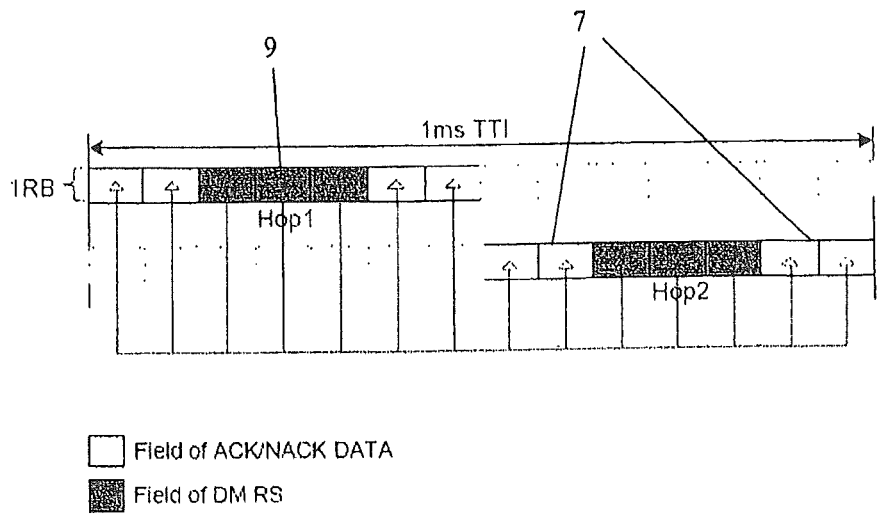
FIG. 4 shows a PUCCH data format (known as format 1a/1b)

FIG. 4 shows the format for feedback reports that is currently favoured for LTE by the 3GPP ($3^{rd}$ Generation Partnership Project). Each TTI in the physical uplink control channel (PUCCH) should conform to the structure shown. A TTI is split into two halves (or hops) each comprising a field for ACK/NACK data 7, and a field for a demodulation reference signal 9 (which is used by the receiving terminal to decode the data). The current LTE format allows up to two bits of feedback data to be transmitted in a single TTI. Prior art bundling schemes allow a mobile terminal to transmit either ACK (0) or NACK (1) in a single bit.

As discussed above, ACK/NACK data is routinely bundled together in order that transmissions can conform to this format. However, when more than one code is assigned to each mobile terminal we have found that the granularity within a bundle can be improved, whilst still retaining the PUCCH format discussed above. The mobile terminal is able to convey more information in each bit of feedback, because the choice of codes provides more alternatives than the simple choice of ACK or NACK allowed by the prior art. In fact, simply assigning each mobile terminal two CAZAC sequences can allow a mobile terminal to transmit twice as much information in that one bit, by allowing the mobile terminal four transmission alternatives instead of the conventional two.

Figure 7:
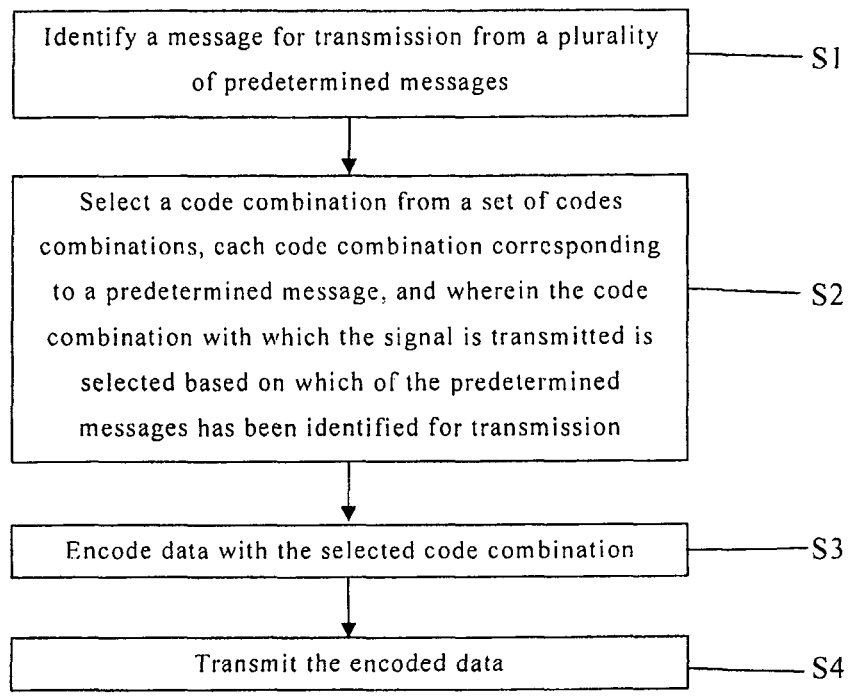
FIG. 7 sets out a method in accordance with the invention.

As set out in FIG. 7, the invention requires a receiving terminal, such as a mobile phone, to check whether it received each data packet correctly, as usual, and to generate a feedback indication for each packet. Those feedback indications then need to be bundled for transmission. However, where there are four downlink streams for each uplink stream, in contrast to the prior art (which would bundle all four feedback indications into one report), the terminal bundles the feedback indications as if the ratio were really 4:2. That is, in order to identify the message to transmit the terminal assumes it has twice as many uplink bits available in which to send the message as it actually does.

Once the terminal has identified the feedback message that it requires to transmit (S1), the terminal looks that message up in its internal memory. That memory stores data identifying a set of all possible feedback messages, which can easily be predetermined when the ratio of downlink to uplink transmissions is known. Each predetermined message corresponds to a unique combination of a data value and a code combination. Thus, the terminal looks its message up in the set to identify what data it should transmit, and what code or combination of codes it should use to transmit that data in order to convey its desired meaning. Once the terminal has selected (S2) the code combination and (if necessary, as discussed below) data for transmission, that data, along with a reference signal, is encoded (S3) with the selected code combination, and transmitted (S4).

Figure 8:
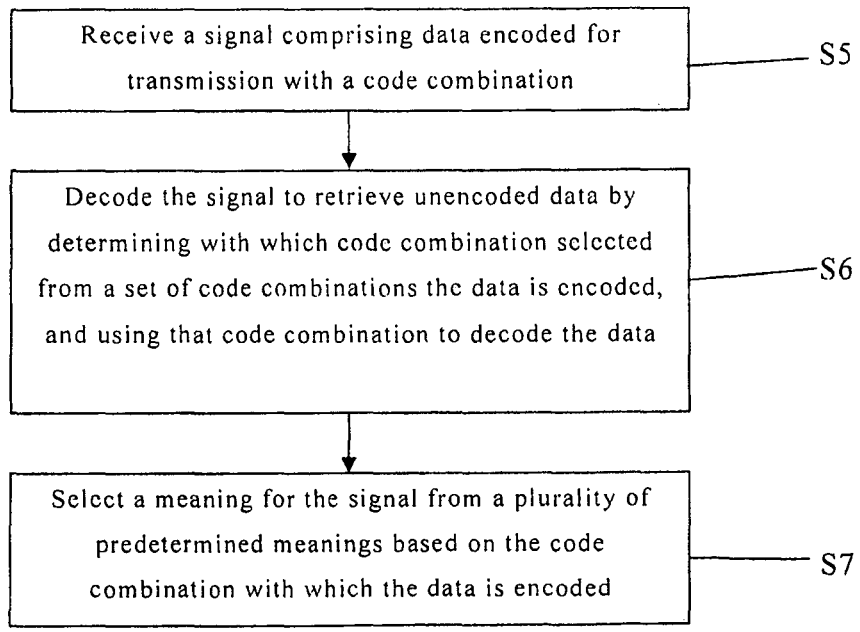
FIG. 8 sets out a complementary method in accordance with the invention.

As set out in FIG. 8, the sending terminal (which was the origin of the downlink transmission, for example, a base station), on the receipt (S5) of the feedback transmission from the receiving terminal, decodes the signal to retrieve the original, unencoded, data (S6). To do that it needs to determine the code combination with which the data is encoded. That may be achieved in any suitable way, such as by using trial and error (e.g. the base station tries to decode the signal with each code combination, and determines that the one for which the reference signal makes sense is the correct combination), or by using a correlation function to see which code/code combination the signal has the strongest mathematical correlation with. When the base station has decoded the signal, it looks at both the data in the transmission and the code, or combination of codes, that the mobile terminal originating the report used for its transmission. The sending terminal then compares the received data and code to the same set of predetermined messages, stored in its internal memory, and selects a meaning for the transmission (S7) using that stored information, in order to identify what feedback the receiving terminal has transmitted. Thus the code combination which is used alters the meaning of the data transmitted, rather than simply being used to decode the transmission.

For example, an 'ACK' encoded with a first code might be interpreted to mean 'ACK, ACK', whilst an 'ACK' encoded with a second code might be interpreted to mean an 'ACK, NACK'. In that way, four pieces of feedback information might be sent in two bits, as shown in Table 1, below.

TABLE 1

Four alternatives are provided by the choice two codes in combination with the value of feedback data

| Code used for transmission | Value of ACK/NACK data | Interpreted by BS as |
|---|---|---|
| CAZAC 1 | ACK | ACK, ACK |
| CAZAC 1 | NACK | ACK, NACK |
| CAZAC 2 | ACK | NACK, ACK |
| CAZAC 2 | NACK | NACK, NACK |

Figure 3:
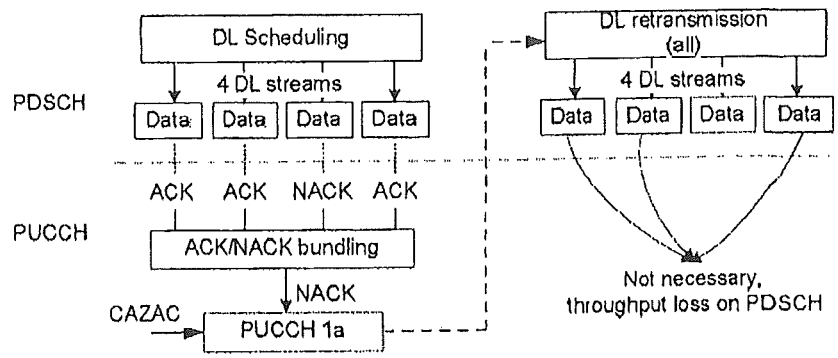
FIG. 3 illustrates a prior art ACK/NACK bundling scheme
Figure 5:
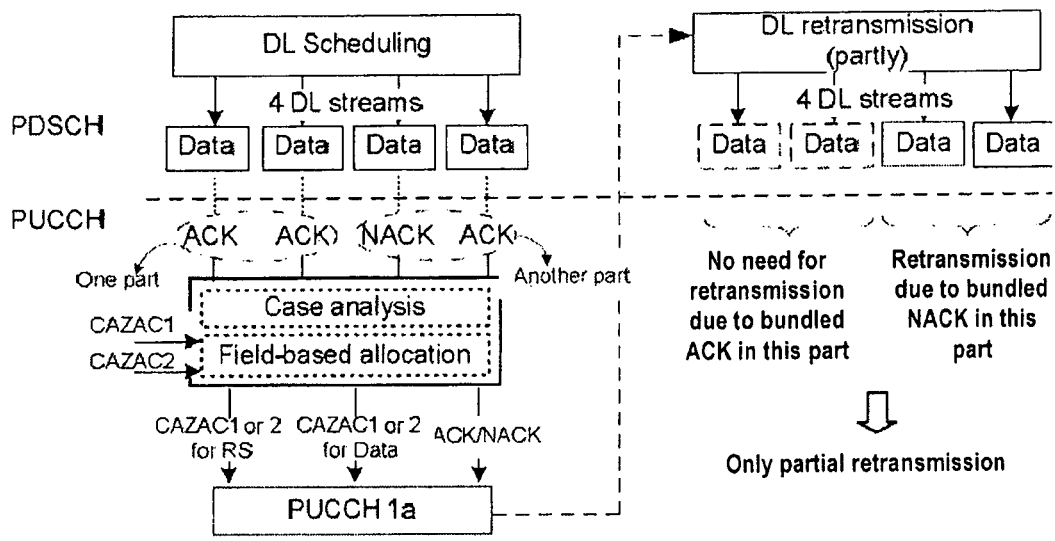
FIG. 5 illustrates an embodiment of an ACK/NACK bundling scheme.

An example of such a method is illustrated in FIG. 5. As in FIG. 3, a mobile terminal receives four streams of downlink data for every uplink time slot on which it is allowed to transmit feedback data. As before, three of those streams are received correctly, but one, marked NACK, is received with errors, or not received at all.

Figure 9:
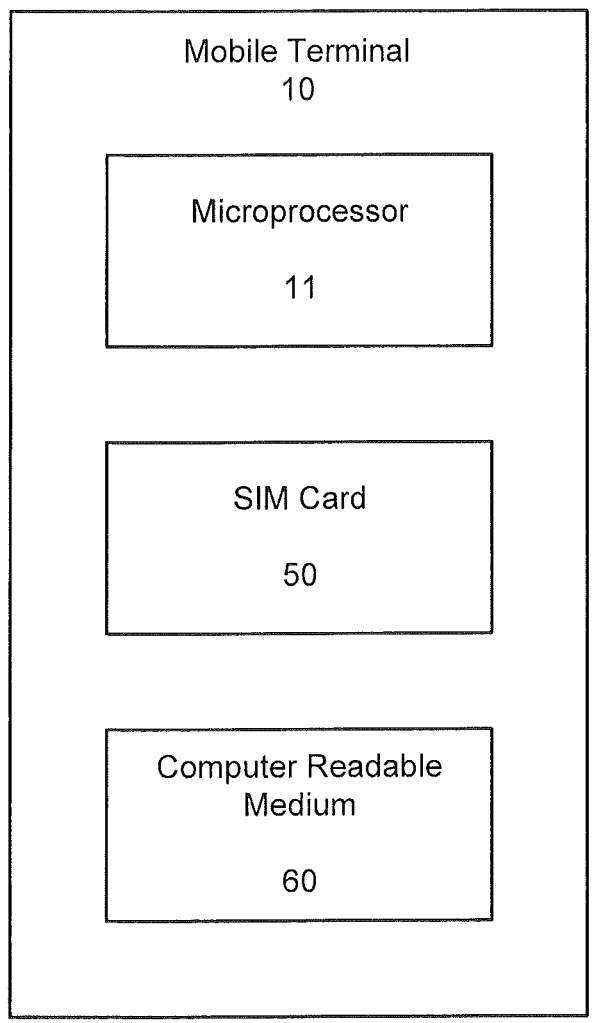
FIG. 9 illustrates an embodiment of a mobile terminal.

As shown in FIG. 9, the mobile terminal 10 comprises a microprocessor 11 which groups the received streams into two groups (i.e. as is the ratio of DL:UL were 2:1, not 4:1 as it is in actuality). The mobile terminal 10 may include a removable medium, such as a mobile phone SIM card 50 or a computer readable medium 60 (such as a CD, DVD, hard drive, memory stick, etc.). In a first group (identified as "one part" in FIG. 5) both data streams were received correctly. However, in a second group (identified as "another part" in FIG. 5) one of the data streams was received correctly, but the other was not. The microprocessor then bundles the feedback reports for the data streams of each group so as to produce a feedback report for each group, using a simple AND operation, as discussed above. In this case, the feedback report for the first group is ACK, whilst the feedback report for the second group is NACK. Thus the mobile terminal microprocessor determines that it needs to transmit feedback of ACK, NACK. As before, however, the mobile terminal is only allocated one bit in which to sends its feedback report on the uplink. It can thus transmit only ACK or NACK, and not both.

The problem of how to transmit two pieces of information in that single bit is addressed by using two different CAZAC codes for the transmission. In the example shown, the mobile terminal looks up its desired feedback, for example in a copy of Table 1 stored in its memory, and determined that it can send its desired feedback message by transmitting data indicating an ACK feedback if, during that transmission the mobile terminal encodes its transmission with CAZAC code 1. When the receiving base station receives ACK data encoded with CAZAC 1, it compares that combination to a corresponding copy of Table 1 stored in its memory, and interprets that transmission to mean ACK, NACK, in accordance with that stored protocol.

The base station thus knows that the first group of data streams was received correctly, but that it needs to retransmit the second group of data streams. In accordance with this example, only two data streams are retransmitted, rather than four, as in the prior art example discussed above. Thus it can be seen that the present bundling scheme is able to reduce the amount of data that must be retransmitted in at least some circumstances.

It will be appreciated that above the method requires the receiving base station to identify the CAZAC code with which the feedback report is transmitted, and to use that identification to interpret the meaning of the data in that report. In contrast, in prior art methods a CAZAC code is used solely to identify the sender of the information, and is not used to interpret the information that is sent.

As shown in FIG. 4, the current format for transmission on the PUCCH has two fields, the reference signal field 9 and the data field 7, and also comprises two distinct portions, the first and second 'hops'. Rather than simply alternating between two possible codes, as discussed above, it is possible for a terminal sending a feedback report to use both codes in the same transmission, in order to provide more transmission variations. For example, a number of different fields can be determined:

Data field: the portion of transmission comprising the ACK/NACK data itself;

RS field: the portion of the transmission comprising the demodulation reference signal;

Hopping field: the first and second 'hops' shown in FIG. 4; and

A combination of these.

This is referred to herein as 'field-distinguished detection'.

Distinguishing between the fields in which two CAZAC sequences are used gives eight different alternatives, as shown in Table 2, below. All eight alternatives can still be transmitted as a single bit of feedback data.

TABLE 2

Eight possibilities are provided when distinguishing between transmission fields, and considering the value of the feedback data.

| Field 1 (eg RS) | Field 2 (eg data) | Value of data | Interpreted by BS as |
|---|---|---|---|
| CAZAC 1 | CAZAC 1 | ACK | ACK, ACK, ACK |
| CAZAC 1 | CAZAC 2 | ACK | ACK, ACK, NACK |
| CAZAC 2 | CAZAC 1 | ACK | ACK, NACK, ACK |
| CAZAC 2 | CAZAC 2 | ACK | NACK, ACK, ACK |
| CAZAC 1 | CAZAC 1 | NACK | ACK, NACK, NACK |
| CAZAC 1 | CAZAC 2 | NACK | NACK, ACK, NACK |
| CAZAC 2 | CAZAC 1 | NACK | NACK, NACK, ACK |
| CAZAC 2 | CAZAC 2 | NACK | NACK, NACK, NACK |

FIG. 5 shows an example in which, during a TTI a first CAZAC code is used in the reference signal (RS) field, whilst a second CAZAC code is used in the ACK/NACK data field itself.

Figure 2:
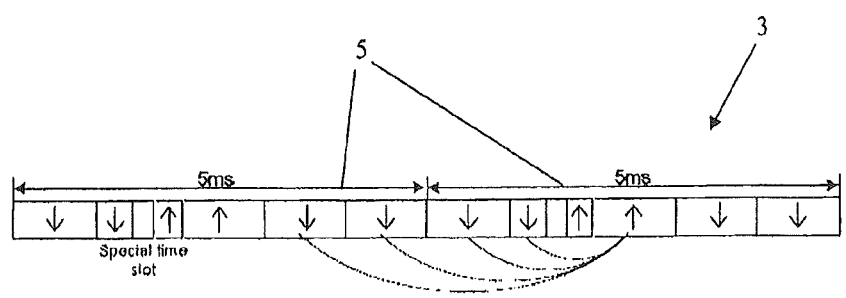
FIG. 2 shows an example of an LTE transmission frame structure with 5 ms periodicity.

It will be appreciated that this allocation scheme is different to the prior art scheme shown in FIG. 2, because the present scheme of ACK/NACK bundling or combination requires the base station to identify the received CAZAC codes, and to map the received CAZAC sequences to different fields within the transmitted signal, as well as simply decoding the received signal.

Providing more options allows more feedback data (e.g. six data streams) to be bundled into the same transmission. For example, six downlink streams can be bundled into a single bit with the same granularity as two downlink streams using a prior art method, or feedback can be sent for three downlink streams in one bit without any bundling at all.

It is possible for the CAZAC code or combination of CAZAC codes alone to convey feedback data, without actually taking the data that is transmitted into account at all. For example, using two codes, and field-based determination, four possible combinations exist, as shown in Table 3 below.

| Field 1 (eg RS) | Field 2 (eg data) | Interpreted by BS as |
|---|---|---|
| CAZAC 1 | CAZAC 1 | ACK, ACK |
| CAZAC 1 | CAZAC 2 | ACK, NACK |
| CAZAC 2 | CAZAC 1 | NACK, ACK |
| CAZAC 2 | CAZAC 2 | NACK, NACK |

Thus the base station receiving the feedback transmission need not necessarily be configured to use the value of the ACK/NACK data to interpret the feedback report at all: the report might be based solely on a field-based determination, whilst the ACK/NACK data field could be used for another purpose. Indeed, the ACK/NACK data field might be omitted altogether from a transmission, and only a reference signal transmitted (e.g. if the hopping field is used).

However, it will be appreciated that taking into account the third 'field' provided by the value of the ACK/NACK data increases the granularity of a transmission.

Figure 6:
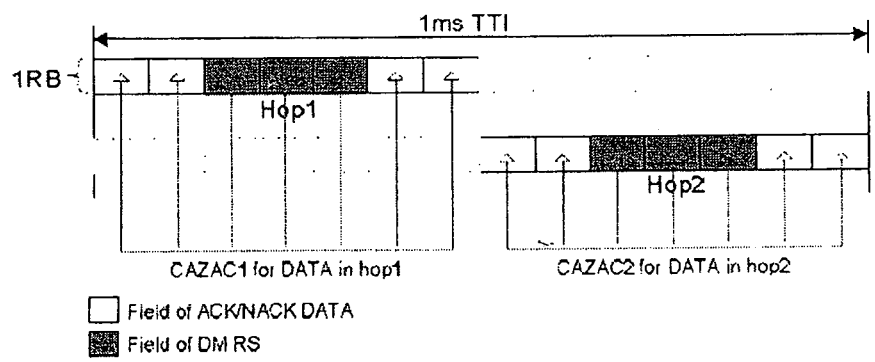
FIG. 6 depicts an embodiment of a modified PUCCH data format.

FIG. 6 illustrates one example of hopping-based CAZAC allocation scheme, wherein one CAZAC sequence is used for the first hop, whilst another CAZAC sequence is used in the second hop.

TABLE 4

A possible field-based mapping function

| Received DL streams | | | PUCCH transmission | |
|---|---|---|---|---|
| Part 1 (2 DLs) | Part 2 (2 DLs) | ACK/ NACK bundling | CAZAC in fields (Hop1, Hop2) | ACK/ NACK data |
| 1  0 0 | 0 0 | (ACK, ACK) | Combination1 (CAZAC1, CAZAC1) | ACK |
| 2  1 1 | 1 1 | (NACK, NACK) | | NACK |
| 3  0 0 | 0 1 | (ACK, NACK) | Combination2 (CAZAC1, CAZAC2) | ACK |
| 4  0 0 | 1 0 | | | |
| 5  0 0 | 1 1 | | | |
| 6  0 1 | 0 0 | (NACK, ACK) | | NACK |
| 7  1 0 | 0 0 | | | |
| 8  1 1 | 0 0 | | | |
| 9  0 1 | 1 0 | (NACK, NACK) | Combination3 (CAZAC2, CAZAC1) | ACK |
| 10  0 1 | 0 1 | | | |
| 11  1 0 | 1 0 | | | NACK |
| 12  1 0 | 0 1 | | | |
| 13  1 1 | 1 0 | (NACK, NACK) | Combination4 (CAZAC2, CAZAC2) | ACK |
| 14  1 1 | 0 1 | | | |
| 15  1 0 | 1 1 | | | NACK |
| 16  0 1 | 1 1 | | | |

Table 4 presents a possible mapping function based on such a hopping-based CAZAC allocation and the value of the ACK/NACK data itself. A '0' indicates that a data stream was received correctly, whilst a '1' indicates that it was not. Some redundancy is provided in that a number of options are used to mean 'NACK, NACK'. This allows the receiving base station to distinguish between the different types of 'NACK, NACK' (e.g. no data at all is being received (i.e. option 2: 1,1;1,1), which might indicate a fault if no transmissions are received at all for an extended period, or that some data is being received (e.g. option 10: 0,1;0,1) which indicates that the mobile terminal is at least able to receive some data correctly. Providing some redundancy also allows the mapping function to be expanded should more data streams be transmitted.

By adopting multiple CAZAC sequences, the problem of unnecessary downlink transmission can be reduced. Each bundle can be smaller, meaning that the original sender of the transmission is provided with more accurate information on what data it needs to transmit.

This improved ACK/NACK bundling scheme can be applied to existing PUCCH format 1a/1b, as discussed above, and does not require more uplink resource blocks to be allocated. However, it will be appreciated that the invention is not limited to use with transmissions of that format, and can be applied to any transmission where messages to be transmitted are selected from a predefined set of messages.

It will be appreciated that different mapping functions can be defined, e.g. different fields and/or different definition of the parts (i.e. different grouping of data steams), for the above application, and for other applications.

The methods above may be implemented using one or more protocols or programs stored in the internal memory of terminals, such as mobile terminals 10 and base stations 20, with in a network. It will be appreciated that some prior art terminals may be modified to carry out one or more of the above methods by providing those terminals with suitable instructions, such as the protocol or program stored on a removable medium, for example a mobile phone SIM card 50 or computer readable medium 60 (such as a CD, DVD, hard drive, memory stick, etc).

It will be appreciated that more than two codes might be assigned to a given mobile terminal in order to provide more options. For example, three codes would provide 8 options if data within a message is ignored, or 16 options if the data value in the message is taken into account.

Figure 1:
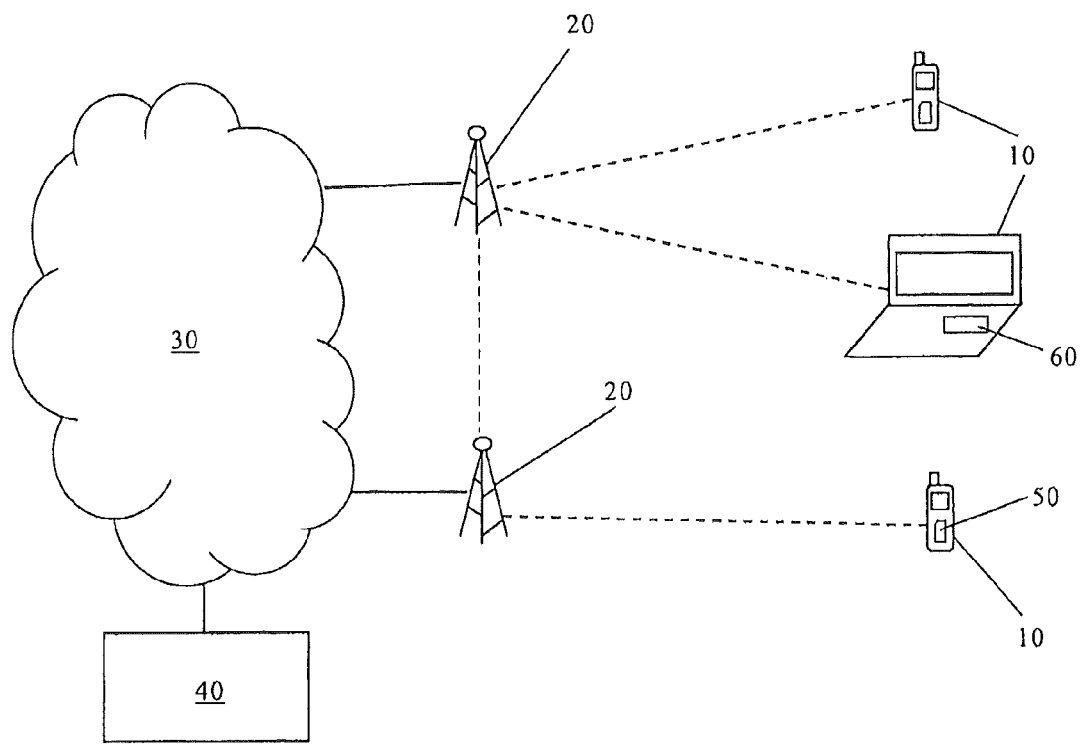
FIG. 1 is a schematic depiction of a prior art telecommunications network.

The invention is not limited to the embodiment described, namely improving resolution in feedback bundling. In fact, it will be appreciated that the invention could be applied to any other communications system in which transmissions from different parties are distinguished in a CDM way. For example, such a telecommunications system may be similar to that shown in FIG. 1, comprising a plurality of transmitters (10) and at least one receiver (20). Each transmitter 10 is arranged to encode its transmissions with a unique code so that the receiver can identify which of the transmitters is the origin of a transmission by identifying with which of the respective unique codes that transmission is encoded. To implement the invention, at least one transmitter in the system should be allocated more than one unique code. The receiver is thus able to identify which one out of a plurality of predetermined meanings a message originating at that transmitter has, by looking at which code or code combination the transmitter has used to encode its message.

Furthermore, the invention is not limited to use with wireless transmission, as discussed herein, but may find application in wired networks, such as optical networks.

The invention claimed is:

1. A method of receiving a telecommunication signal, the method comprising:
   receiving a signal comprising data encoded for transmission with a code combination from a set of code combinations;
   decoding the signal to retrieve the data, the decoding comprising determining the code combination from the set of code combinations with which the data is encoded, and decoding the data based on the code combination; and
   selecting a meaning for the signal from a plurality of predetermined meanings, wherein the meaning is selected based on the code combination with which the data is encoded.

2. The method of claim 1 wherein selecting the meaning comprises comparing the code combination with stored data comprising possible code combinations that can be determined from the set of code combinations, and selecting the meaning that corresponds to the code combination from the stored data.

3. The method of claim 1 wherein the meaning is selected based on at least some of the data which is transmitted in the signal and the code combination with which the signal is encoded.

4. The method of claim 1 wherein the set of code combinations comprises two code combinations.

5. The method of claim 4 wherein the signal comprises at least two fields, and wherein selecting the meaning comprises selecting the meaning based on which of the two code combinations is used when transmitting each of the respective fields.

6. The method of claim 5 wherein the at least two fields comprise at least two distinct portions of the signal.

7. The method of claim 5 wherein the at least two fields comprise a first signal portion field comprising feedback data and a second signal portion field containing a reference signal.

8. The method of claim 1 wherein the meaning that is selected comprises one of a plurality of feedback data meanings.

9. The method of claim 1 wherein receiving, decoding, and selecting are implemented in a time division duplex telecommunication system.

10. A method of transmitting a telecommunication signal, the method comprising:
   identifying a message for transmission, the message being selected from a plurality of predetermined messages;
   selecting a code combination from a set of code combinations, each code combination of the set corresponding to a respective one of the predetermined messages;
   encoding data with the code combination selected from the set of code combinations, and
   transmitting the data encoded with the code combination selected from the set of code combinations,
   wherein at least one code combination of the set of code combinations imparts a meaning to the data that is different than an unencoded meaning of the data, and wherein the code combination with which the data is encoded is selected based on which of the predetermined messages has been identified for transmission.

11. The method of claim 10 wherein the data comprises first and second distinct fields, and wherein selecting the code combination comprises selecting first and second code combinations from the set of code combinations to transmit for each of the first and second distinct fields respectively.

12. The method of claim 10 further comprising;
   generating a plurality of feedback reports in in response to received data,
   wherein identifying the message for transmission comprises bundling at least two of the plurality of feedback reports.

13. The method of claim 12 implemented in a time division duplex system in which the ratio of information received from a first transmission direction to information transmitted in a second, opposite, transmission direction is X:1 (where X≠1), and wherein identifying the message comprising bundling the feedback reports as if the ratio were X/Y:1, wherein Y≤X, and Y≠0.

14. The method of claim 10 wherein identifying, selecting, encoding, and transmitting are implemented in a code division multiplex system.

15. A method of conveying information in a telecommunications system comprising:
   identifying a message for transmission from a first node, the message being selected from a plurality of predetermined messages;
   selecting a code combination from a set of codes combinations at the first node, each code combination of the set corresponding to a respective one of the predetermined messages;
   encoding data with the code combination selected from the set of code combinations at the first node, and
   from the first node, transmitting the data encoded with the code combination selected from the set of code combinations over an air interface;
   at a second node, receiving the data encoded with the code combination selected from the set of code combinations over the air interface;
   at the second node, decoding the data encoded with the code combination to retrieve the data, the decoding comprising determining the code combination from the set of code combinations with which the data is encoded, and decoding the data based on the code combination; and
   at the second node, selecting the message from the plurality of predetermined messages based on the code combination with which the data was encoded.

16. A telecommunications system arranged to carry out the method of claim 1.

17. A terminal for a telecommunications system arranged to carry out the method of claim 1.

18. A method of operating a mobile terminal in a wireless telecommunications network, the method comprising:
   receiving a downlink communication from the wireless telecommunications network, wherein the downlink communication includes a plurality of data packets;
   for each of the plurality of data packets, generating a respective feedback indication responsive to receiving the respective data packet correctly or incorrectly;
   selecting a feedback message responsive to the feedback indications for the plurality of data packets of the downlink communication, wherein the feedback message is selected from a set of feedback messages defined using a plurality of code division multiplexing (CDM) codes; and
   transmitting the feedback message selected from the set of feedback messages to the telecommunications network.

19. The method of claim 18 wherein the plurality of CDM codes comprise a plurality of constant amplitude zero auto-correlation (CASAC) codes.

20. The method of claim 18,
   wherein the set of feedback messages includes,
      a first message defined using a first CDM code and a first bit value,
      a second message defined using the first CDM code and a second bit value,
      a third message defined using the first bit value and a second CDM code, and
      a fourth message defined using the second bit value and the second CDM code, and
   wherein transmitting the feedback message comprises transmitting the feedback message including the respective bit value using the respective CDM code defined by the feedback message selected responsive to the feedback indications.

21. The method of claim 18,
   wherein the feedback message includes first and second message fields, wherein the set of feedback messages includes
- a first message defined using a first CDM code for the first and second message fields,
- a second message defined using the first CDM code for the first message field and a second CDM code for the second message field,
- a third message defined using the second CDM code for the first message field and the first CDM code for the second message field, and
- a fourth message defined using the second CDM code for the first and second message fields, and wherein transmitting the feedback message comprises transmitting the first and second message fields using the respective CDM codes defined by the feedback message selected responsive to the feedback indications.

22. The method of claim 18
wherein the feedback message includes first and second message fields,
wherein the set of feedback messages includes,
- a first message defined using a first CDM code for the first and second message fields and a first bit value for the first and second message fields,
- a second message defined using the first CDM code for the first and second message fields and a second bit value for the first and second message fields,
- a third message defined using the first CDM code for the first message field, a second CDM code for the second message field, and the first bit value for the first and second message fields,
- a fourth message defined using the first CDM code for the first message field, the second CDM code for the second message field, and the second bit value for the first and second message fields,
- a fifth message defined using the second CDM code for the first message field, the first CDM code for the second message field, and the first bit value for the first and second message fields,
- a sixth message defined using the second CDM code for the first message field, the first CDM code for the second message field, and the second bit value for the first and second message fields,
- a seventh message defined using the second CDM code for the first and second message fields and a first bit value for the first and second message fields, and
- an eighth message defined using the second CDM code for the first and second message fields and a second bit value for the first and second message fields, and wherein transmitting the feedback message comprises transmitting the first and second message fields using the respective CDM codes and bit values defined by the feedback message selected responsive to the feedback indications.

* * * * *